(12) United States Patent
Curic et al.

(10) Patent No.: US 12,341,667 B2
(45) Date of Patent: Jun. 24, 2025

(54) IDENTIFYING THE USER EXPERIENCE AND SLA FULFILLMENT IMPACT OF CONTROL APPLICATIONS PRIOR TO DEPLOYMENT

(71) Applicant: International Business Machines Corporation, Armonk, NY (US)

(72) Inventors: Maja Curic, Munich (DE); Sagar Tayal, Ambala (IN); Alecio Pedro Delazari Binotto, Munich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 18/047,031

(22) Filed: Oct. 17, 2022

(65) Prior Publication Data

US 2024/0129207 A1 Apr. 18, 2024

(51) Int. Cl.
H04L 41/5019 (2022.01)
H04L 41/14 (2022.01)
(Continued)

(52) U.S. Cl.
CPC ........ H04L 41/5019 (2013.01); H04L 41/145 (2013.01); H04L 41/5009 (2013.01); H04L 41/5067 (2013.01); H04L 43/55 (2022.05)

(58) Field of Classification Search
CPC ............... H04L 41/145; H04L 41/5009; H04L 41/5019; H04L 41/5067; H04L 43/55
See application file for complete search history.

(56) References Cited

U.S. PATENT DOCUMENTS 10,740,081 B2 * 8/2020 Newell ..................... G06F 8/60
11,330,447 B2 5/2022 Lau
(Continued)

FOREIGN PATENT DOCUMENTS

CN 110166305 A 8/2019
EP 2779718 A1 9/2014
(Continued)

OTHER PUBLICATIONS

Jagannath et al. "Digital Twin Virtualization with Machine Learning for IoT and Beyond 5G Networks: Research Directions for Security and Optimal Control", WiseML '22, pp. 81-86, May 16, 2022. Retrieved from the Internet: <URL: https://dl.acm.org/doi/10.1145/3522783.3529519>. (Year: 2022).*

(Continued)

*Primary Examiner* — Thomas J Dailey
(74) *Attorney, Agent, or Firm* — CANTOR COLBURN LLP; Kelsey M. Skodje

(57) ABSTRACT

Embodiments of the invention provide a computer-implemented method that includes intercepting, using a controller of a programmable network (PN), a deployment of a control application in the PN. Responsive to intercepting the deployment of the control application, a user experience (UE) analysis is performed. The UE analysis includes determining, based at least in part on a set of digital twins, a UE impact of the control application; and, based at least in part on the UE impact, generating a UE-based control application deployment recommendation. The UE analysis further includes deploying the control application based at least in part on the UE-based control application deployment recommendation.

20 Claims, 13 Drawing Sheets

(51) Int. Cl.
  *H04L 41/5009* (2022.01)
  *H04L 41/5067* (2022.01)
  *H04L 43/55* (2022.01)

(56) References Cited

U.S. PATENT DOCUMENTS

| | | | | |
|---|---|---|---|---|
| 11,456,926 | B1* | 9/2022 | Mermoud | H04L 41/5067 |
| 12,082,051 | B2* | 9/2024 | Junkins | H04W 28/0268 |
| 2019/0372826 | A1 | 12/2019 | Sherr | |
| 2019/0372852 | A1* | 12/2019 | Aparicio | H04L 41/0836 |
| 2021/0109837 | A1* | 4/2021 | Rakshit | G06F 11/3476 |
| 2022/0165438 | A1* | 5/2022 | Marzorati | G05B 13/04 |
| 2022/0191648 | A1* | 6/2022 | Smith | H04W 4/023 |
| 2023/0236871 | A1* | 7/2023 | Marzorati | G06F 30/27 |
| | | | | 718/100 |

FOREIGN PATENT DOCUMENTS

| | | |
|---|---|---|
| EP | 3026951 A2 | 6/2016 |
| WO | 2015053788 A1 | 4/2015 |

OTHER PUBLICATIONS

Shen et al. "Holistic Network Virtualization and Pervasive Network Intelligence for 6G", IEEE Comm'ns Surveys & Tutorials, vol. 24, Iss. 1, First quarter 2022, Dec. 15, 2021. DOI: 10.1109/COMST.2021.3135829. (Year: 2021).*

Kherbache et al. "When Digital Twin Meets Network Softwarization in the Industrial IoT: Real-Time Requirements Case Study." Sensors 21.24 (2021): 8194. 17 pages.

Medvetskyi et al. "A quality of experience management method for intent-based software-defined networks." 2021 IEEE 16th International Conference on the Experience of Designing and Application of CAD Systems (CADSM). IEEE, 2021. 4 pages.

Roy et al. "Achieving AI-enabled Robust End-to-End Quality of Experience over Radio Access Networks." arXiv preprint arXiv:2201.05184 (2022). 13 pages.

Sun et al. "A digital twin network solution for end-to-end network service level agreement (SLA) assurance." Digital Twin 1.5 (2021): 5. 9 pages.

* cited by examiner

| Time | Site ID | Cell ID | Azimuth | Height | Latitude | Long. | Carrier | Tech support | Performance KPI | Fault data | Hardware assets | Deployed control app | Active control app | Active users list |
|---|---|---|---|---|---|---|---|---|---|---|---|---|---|---|
| 03.02.22 09:12 | ABC | ABC.XX | 30 | 28 | 22.1134 | 23.1245 | 700;1800 | LTE | Acc:98.2%;PL:0.2% | No | BBU-1,Ant-2TxRx | xAPP1,xAPP2,xAPP3 | xAPP1,xAPP2 | 21334;21335;21336 |
| 03.02.22 09:13 | ABC | ABC.XY | 120 | 12 | 22.1134 | 23.1245 | 3500;700;1800 | 5GSA;LTE | Acc:99.76%;PL:0.5% | No | BBU-2,Ant-AAU | xAPP1,xAPP2,xAPP3 | xAPP1,xAPP2 | 21339 |
| 03.02.22 09:13 | ABC | ABC.XZ | 210 | 28 | 22.1134 | 23.1245 | 700;1800 | LTE | Acc:98.37%;PL:0.1% | No | BBU-1,Ant-4TxRx | xAPP1,xAPP2,xAPP3 | xAPP1,xAPP2 | 21334;21335;21336 |
| 03.02.22 09:14 | ABC | ABC.XY | 120 | 12 | 22.1134 | 23.1245 | 3500;700;1800 | 5GSA;LTE | Acc:99.4%;PL:0.6% | No | BBU-2,Ant-AAU | xAPP1,xAPP2,xAPP3 | xAPP1,xAPP2 | 21336;21337 |
| 03.02.22 09:14 | ABC | ABC.XZ | 210 | 28 | 22.1134 | 23.1245 | 700;1800 | LTE | Acc:98.5%;PL:0.1% | No | BBU-1,Ant-2TxRx | xAPP1,xAPP2,xAPP3 | xAPP1,xAPP2 | 21334;21341 |
| 03.02.22 09:14 | ABC | ABC.XX | 30 | 28 | 22.1134 | 23.1245 | 700;1800 | LTE | Acc:97.2%;PL:0.1% | No | BBU-1,Ant-2TxRx | xAPP1,xAPP2,xAPP3 | xAPP1,xAPP2 | 21336;21339;21340 |
| 03.02.22 09:14 | ABC | ABC.XY | 120 | 12 | 22.1134 | 23.1245 | 3500;700;1800 | 5GSA;LTE | Acc:99.2%;PL:0.8% | No | BBU-2,Ant-AAU | xAPP1,xAPP2,xAPP3 | xAPP1,xAPP2 | 21334;21335;21336 |
| 03.02.22 09:15 | ABC | ABC.XZ | 210 | 28 | 22.1134 | 23.1245 | 700;1800 | LTE | Acc:98.3%;PL:0.2% | No | BBU-1,Ant-4TxRx | xAPP1,xAPP2,xAPP3 | xAPP1,xAPP2 | 21334;21341 |

Network Twin Snapshot 600

FIG. 6

User Twin Snapshot 700 

| Time | Customer ID | Location | End device | Mobility status | Active state | Application type | Usage pattern | Desired QoE | Customer profile | Perceived QoE | SLA fulfillment |
|---|---|---|---|---|---|---|---|---|---|---|---|
| 03.02.22 09:12 | 21334 | 22.12,23.12 | Apple XR | Fast moving | Active | eMBB | Bursty | High | Premium | PL-0.5%;Thp-12Mb/sec | Not Ok |
| 03.02.22 09:13 | 21335 | 22.12,23.12 | Samsung galaxy | static | Passive | eMBB | Bursty | Low | Normal | PL-0.7%;Thp-11Mb/sec | Ok |
| 03.02.22 09:13 | 21336 | 24.12,23.62 | AR/VR | static | Passive | eMBB;uRLLC | Dormant | High | Premium | PL-0.4%;Thp-18Mb/sec | Not Ok |
| 03.02.22 09:14 | 21337 | 24.12,23.62 | Drone | Moving | Passive | uRLLC | Dormant | High | Premium | PL-0.6%;Thp-6.6Mb/sec | Ok |
| 03.02.22 09:14 | 21338 | 25.12,23.82 | Drone | Moving | Passive | uRLLC | Dormant | High | Premium | PL-0.6%;Thp-8Mb/sec | Ok |
| 03.02.22 09:14 | 21339 | 25.12,23.82 | AR/VR | static | Active | eMBB;uRLLC | High usage | High | Premium | PL-0.1%;Thp-13Mb/sec | Ok |
| 03.02.22 09:14 | 21340 | 22.42,23.02 | AR/VR | static | Active | eMBB;uRLLC | High usage | High | Premium | PL-0.1%;Thp-12Mb/sec | Ok |
| 03.02.22 09:15 | 21341 | 22.42,23.02 | Smart meter | static | Passive | mMTC | Dormant | Low | Normal | PL-0.9%;Thp-1Mb/sec | Ok |

FIG. 7

User-device Twin Snapshot 800

| End Device | Chipset | Band support | Tech support | Feature support |
|---|---|---|---|---|
| Apple XR | QC | n3500;700;1800 | 5G SA;LTE | Massive MIMO;Beam foaming |
| Samsung galaxy | Exynos | 700;1800 | LTE | 4*4 MIMO |
| AR/VR | MTK | n3500;700;1800 | 5G SA;LTE | Massive MIMO;Beam foaming |
| Drone | QC | n3500;700;1800 | 5G SA;LTE | Massive MIMO;Beam foaming |
| Drone | QC | n3500;700;1800 | 5G SA;LTE | Massive MIMO;Beam foaming |
| AR/VR | MTK | n3500;700;1800 | 5G SA;LTE | Massive MIMO;Beam foaming |
| AR/VR | MTK | n3500;700;1800 | 5G SA;LTE | Massive MIMO;Beam foaming |
| Smart meter | QC | 700 | LTE | 1*1 MIMO |

FIG. 8

Network, user-device, and user types 980

PN1 = Supports 5G/LTE & multi-carrier; KPI (key performance indicator) achieved is high

PN2 = Supports LTE & single-carrier; KPI achieved is low

User-device1 = High latency requirement; 5G supported

User-device2 = High latency requirement; 5G supported

User-device3 = Voice calls; single carrier supported

User1 = Low customer service score

User2 = Normal customer service score

User3 = High customer service score

FIG. 9B

IDENTIFYING THE USER EXPERIENCE AND SLA FULFILLMENT IMPACT OF CONTROL APPLICATIONS PRIOR TO DEPLOYMENT

BACKGROUND

The present invention relates generally to programmable networks. More specifically, the present invention relates to programmable computer systems, computer-implemented methods, and computer program products operable to identify the user experience (UE) and service level agreement (SLA) fulfillment impact of control application software prior to deployment of the control application in its programmable network.

A communications service provider (CSP) offers telecommunications services or some combination of information service, media services, content, entertainment, and application services over networks, thereby leveraging the network infrastructure as a rich, functional platform. CSPs include telecommunications carriers; content and application service providers (CASP); cable service providers; satellite broadcasting operators; cloud communications service providers; and the like. CSPs use networks configured as programmable networks (PNs) that decouple the network control logic from the devices performing the function. Such devices can include, for example, the network routers that control the movement of information in the underlying network.

An example type of PN is so-called software-defined networks (SDNs). In general, SDNs decouple the control logic in a network from the devices performing network functions. Such devices can include, for example, the network routers that control the movement of information in the underlying network. SDNs include three main components, namely, SDN control applications, SDN controllers, and networking devices. These components may or may not be located in the same physical area. The SDN controller relays information about the network or requests for specific resource availability or allocation. The SDN controller communicates with the SDN control applications to determine the destination of data packets. Network devices receive instructions from the SDN controller regarding how to route the packets. A CSP can deploy several SDN control applications, each having its own operational goals.

The SDN controller is the core of an SDN. It resides between network devices at one end of the network and SDN control applications at the other end. Any communication between SDN control applications and network devices must go through the SDN controller. SDN control applications direct traffic according to forwarding policies that a network operator puts in place, thereby minimizing manual configurations for individual network devices. By taking the control plane off of the network hardware and running it instead as software, the centralized controller facilitates automated network management and makes it easier to integrate and administer business applications. In effect, the SDN controller serves as a sort of operating system (OS) for the network.

However, known PNs and/or SDNs have shortcomings. For example, known PNs/SDNs do not identify the customer/user experience and/or SLA fulfillment impact of each control application as part of its deployment process. Accordingly, it can be unclear how a specific update from a specific control application relates to or will impact the quality of experience (QoE) and/or SLA fulfillment for end consumers/users. Additionally, some control application updates perform improvements that are actually not needed as all users have their adequate and desired QoE fulfilled at the observed point of time, and at the same point of time there is no higher-level policy to justify such updates (e.g., energy saving).

Various factors contribute to the difficulty that known PNs/SDNs would experience if they attempted to evaluate the UE/SLA impact of a control application. For example, the operational network can have users with diverse applications, and the user-devices can include their own diverse requirements and capabilities, which cannot be simulated in a lab using known techniques. As another example, it is difficult to evaluate the combined impact of multiple control applications. For example, when two or more control applications govern the network's behavior, it is not straightforward to identify their combined effect on QoE and how actions enforced by each contribute to or detract from QoE and/or SLA fulfillment.

SUMMARY

Embodiments of the invention provide a computer-implemented method that includes intercepting, using a controller of a programmable network (PN), a deployment of a control application in the PN. Responsive to intercepting the deployment of the control application, a user experience (UE) analysis is performed. The UE analysis includes determining, based at least in part on a set of digital twins, a UE impact of the control application; and, based at least in part on the UE impact, generating a UE-based control application deployment recommendation. The UE analysis further includes deploying the control application based at least in part on the UE-based control application deployment recommendation.

Thus, embodiments of the invention provide improvements over known methods of PNs/SDNS by using digital twins of the network, users/customers, and user-devices to provide robust and dynamic data that can be used to predict or identify the customer/user experience and/or SLA fulfillment impact of each control application as part of its pre-deployment process. Accordingly, embodiments of the invention provide visibility into how a specific update from a specific control application relates to or will impact the quality of experience (QoE) and/or SLA fulfillment for end consumers/users. Additionally, embodiments of the invention provide visibility into the control applications and updates that perform improvements that are actually needed vs the control applications and updates that perform improvement that are not needed as all users have their adequate and desired QoE fulfilled at the observed point of time, and at the same point of time there is no higher-level policy to justify such updates (e.g., energy saving).

In addition to one or more of the features described above, or as an alternative to any of the foregoing embodiments, the UE analysis further includes predicting a change in how a deployed control application will perform after deploying the control application; predicting the change in how the deployed control application and the control application will perform after deploying the control application based at least in part on a PN condition; and predicting the change in how the deployed control application and the control application will perform after deploying the control application is based at least in part on a capability of a user-device deployed in the PN.

Thus, embodiments of the invention provide improvements over known methods of PNs/SDNS by using digital twins of the network, users/customers, and user-devices to provide robust and dynamic data that can be used to predict or identify the customer/user experience and/or SLA fulfillment impact of each control application as part of its pre-deployment process. Accordingly, embodiments of the invention provide visibility into how a specific update from a specific control application relates to or will impact or change the quality of experience (QoE) and/or SLA fulfillment for end consumers/users based at least in part on a PN condition; and/or a capability of a user-device deployed in the PN.

Embodiments of the invention further provide a computer system and a computer program product having substantially the same features and as the above-described computer-implemented method.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

FIG. 6 depicts a table illustrating a network twin snapshot in accordance with embodiment of the invention;

FIG. 7 depicts a table illustrating a user twin snapshot in accordance with embodiment of the invention;

FIG. 8 depicts a table illustrating a user-device twin snapshot in accordance with embodiment of the invention;

FIG. 9B depicts examples of PNs types, user types, and user-device types in accordance with embodiments of the invention;

Figure 1:
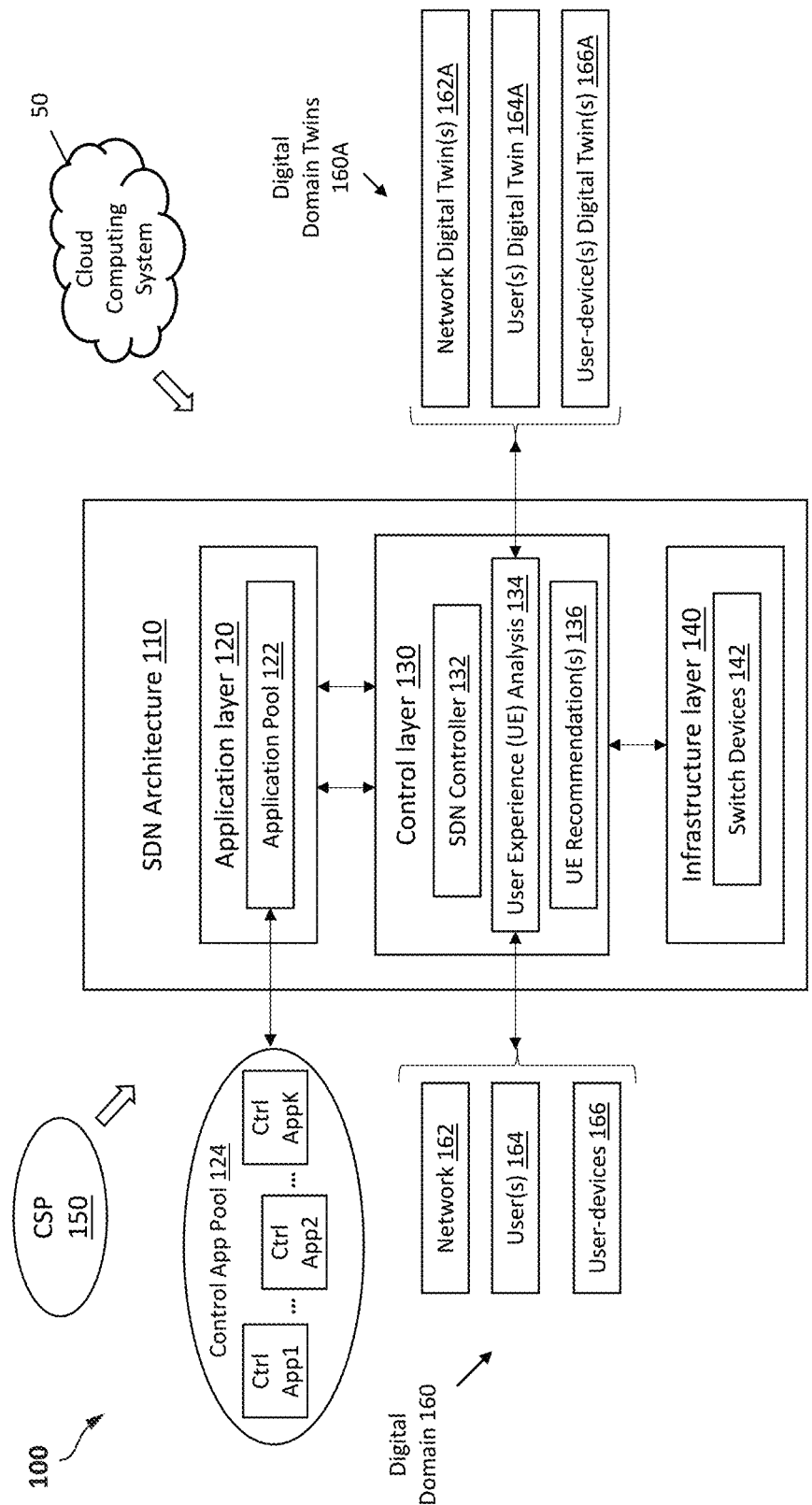
FIG. 1 depicts a simplified block diagram illustrating an exemplary programmable network (PN) system in accordance with embodiments of the present invention.

In the accompanying figures and following detailed description of the disclosed embodiments, the various elements illustrated in the figures are provided with three or four digit reference numbers, where possible. The leftmost digit(s) of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification are illustrated as logical blocks such as generators, discriminators, modules, processors, and the like. Embodiments of the invention apply to a wide variety of implementations of the logical blocks described herein. For example, a given logical block can be implemented as a hardware circuit operable to include custom VLSI circuits or gate arrays, as well as off-the-shelf semiconductors such as logic chips, transistors, or other discrete components. The logical blocks can also be implemented in programmable hardware devices such as field programmable gate arrays, programmable array logic, programmable logic devices, and the like. The logical blocks can also be implemented in software for execution by various types of processors. Some logical blocks described herein can be implemented as one or more physical or logical blocks of computer instructions which can, for instance, be organized as an object, procedure, or function. The executables of a logical block described herein need not be physically located together but can include disparate instructions stored in different locations which, when joined logically together, include the logical block and achieve the stated purpose for the logical block.

Turning now to a more detailed description of technologies that are relevant to aspects of the invention, a communications service provider (CSP) offers telecommunications services or some combination of information service, media services, content, entertainment, and application services over networks, thereby leveraging the network infrastructure as a rich, functional platform. CSPs include telecommunications carriers; content and application service providers (CASP); cable service providers; satellite broadcasting operators; cloud communications service providers; and the like. CSPs use networks configured as programmable networks (PNs) that decouple the network control logic from the devices performing the function. Such devices can include, for example, the network routers that control the movement of information in the underlying network.

One example of a PN is software-defined networks (SDNs). SDNs include three main components, namely, SDN control applications, SDN controller, and networking devices. These components may or may not be located in the same physical area. SDN control applications are triggered by the real-time events from the network. The control applications identify and enforce the appropriate network updates with respect to their network operations goal. For example, an SDN control application can reroute network data traffic to avoid predicted congestion. An SDN control application can also increase the transmission power of a radio cell in a radio access network (RAN) to improve the coverage for the customers/users located at the cell edge. A CSP can deploy several SDN control applications, each having its own operational goals.

Turning now to an overview of aspects of the present invention, embodiments of the invention provide programmable computer systems, computer-implemented methods, and computer program products operable to identify the UE, and SLA fulfillment impact of control application software in PNs prior to deployment of the control application. In embodiments of the invention, application (or software)

deployment is the process of installing, configuring, and enabling a specific application or set of applications, usually through an application manager (app manager) or software management system, to a specific URL (uniform resource locator) on a server. In some embodiments of the invention, the to-be-deployed control application is a new control application. In some embodiments of the invention, the to-be-deployed control application is an update for an existing and deployed control application. In embodiments of the invention, a mechanism is provided for analyzing the impact of a control application or a set of control applications on the perceived UE. UE is often referred to as QoE. In general, QoE is a measure of the delight or annoyance a user experiences when utilizing a service such as web browsing, phone calls, television broadcasts, and the like. In embodiments of the invention, the mechanism for analyzing the impact of a control application or a set of control applications on the perceived UE leverages the use of a set of digital domain twins operable to include any combination of PN digital twins, user digital twins, and user-device digital twins. The mechanism for analyzing UE impact can also be used to identify and propose an optimal combination of control applications for reaching specific operational goals (e.g., SLA fulfillment with the least energy consumption, SLA fulfillment with superior service for premium customers, etc.). The mechanism for analyzing UE impact can be applied on a to-be-deployed control application to ensure that to-be-deployed controlled applications are controlled and deployed in a manner that does not degrade or negatively impact UE/QoE, and/or SLA fulfillment requirements.

Turning now to a more detailed description of aspects of the present invention, FIG. 1 is a non-limiting, simplified block diagram of a system 100 in accordance with embodiments of the invention. The system 100 includes an SDN architecture 110 in communication with a CSP 150 and an optional cloud computing system 50, configured and arranged as shown. In embodiments of the invention, the SDN architecture 110 includes an application layer 120, a control layer 130, and an infrastructure layer 140, configured and arranged as shown. The SDN 110 can be split into a management plane, a control plane, and a data plane, where the application layer 120 is part of the management plane; the control layer 130 is part of the control plane; and the infrastructure layer 140 is part of the data plane. The management plane is represented by network management/control applications such as those related to traffic engineering, mobility management, wireless communications, security, and reliability. These management/control applications are implemented using network programming languages and they interact with the control plane through an open northbound application programming interface (API). The control plane controls the forwarding devices via an open southbound API. The control plane is responsible for sending commands to the forwarding devices in order for them to apply the required networking policy. The data plane is formed from forwarding devices (e.g., switches, routers, etc.).

The application layer 120 includes an application pool 122, which includes a control application pool 124 having available control applications designated as Ctrl App1, Ctrl App2, . . . , Ctrl AppK (where "K" is the number of available control applications). The control layer 130 includes an SDN controller 132, a user experience (UE) (and/or QoE) analysis module 134, and a UE (and/or QoE) recommendation module 136, configured and arranged as shown. The infrastructure layer 140 includes a variety of infrastructure hardware devices, including, for example COTS (commercial off-the-shelf) hardware such as switch devices 142.

In embodiments of the invention, a cloud computing system 50 is, optionally, in wired or wireless communication with one or more components/modules of the system 100. Cloud computing system 50 can supplement, support, or replace some or all of the functionality of the components/modules of the system 100. Additionally, some or all of the functionality of the components/modules that form the system 100 can be implemented as a node of the cloud computing system 50. Additional details of how cloud computing functionality can be implemented in accordance with aspects of the invention are depicted by the computing environment 1200 shown in FIG. 12 and described in greater detail subsequently herein.

The various components/modules of the system 100 shown in FIG. 1 are depicted separately for ease of illustration and explanation. In embodiments of the invention, the functions performed by the various components/modules of the system 100 can be distributed differently than shown. For example, in some embodiments of the invention, some or all of the functionality of the UE analysis module 134 and/or the UE recommendation module 136 could be integrated into other network components of the CSP 150 and/or the cloud computing system 50.

In accordance with embodiments of the invention, the UE analysis module 134 is operable to analyze the impact of a to-be-deployed control application, or a set of control applications including the to-be-controlled control application, on the perceived UE by leveraging the creation of a set of digital domain twins 160A that track a digital domain 160 of the SDN architecture 110. In accordance with embodiments of the invention, the digital domain 160 is designated as including the actual network 162 (corresponding to the SDN 110), users 164, and the user-device 166. Further in accordance with embodiments of the invention, a set of digital domain twins 160A are created, with each set including network digital twins 162A, user digital twins 164A, and user-device digital twins 166A. The digital twins described herein in connection with embodiments of the invention can each be viewed as a machine that emulates or "twins" the life of a physical entity. A digital twin in accordance with aspects of the invention is more than just a simple simulation or a static model. The disclosed digital twin is a continuously evolving model that is always aware of the events happening in its physical twin as it follows the physical twin's lifecycle to supervise and optimize the physical twin's functions. The synchronization between the digital twin and its physical counterpart is possible because of the real-time data uploading ensured by IoT devices and sensor technology, while big data storage capabilities enable the capture and maintenance of historical data that can also be useful for the digital twin. AI/ML algorithms can be used to predict future states of the physical twin. A digital twin can also simulate new configurations for the corresponding physical twin before the physical twin is deployed.

In aspects of the invention, the network digital twin 162A can be created and maintained using domain infrastructure-related data including the installed network hardware assets; spectrum carriers; technology support; hardware locations and capabilities; domain user-plane states including performance and fault data; and domain control-plane state including the set of deployed and active control applications, along with a sequential set of triggered actions from the control applications (i.e., control application activity). In aspects of the invention, the user digital twin 164A can be created and maintained using user-related data including user location, user mobility, user activity patterns, application usage, desired QoE, current QoE, customer profile, SLAs and end-user service activity. In aspects of the invention, the user-device digital twin 166A can be created and maintained using information about user-devices in use, user-device capabilities, perceived network conditions, and carriers supported.

Figure 2:
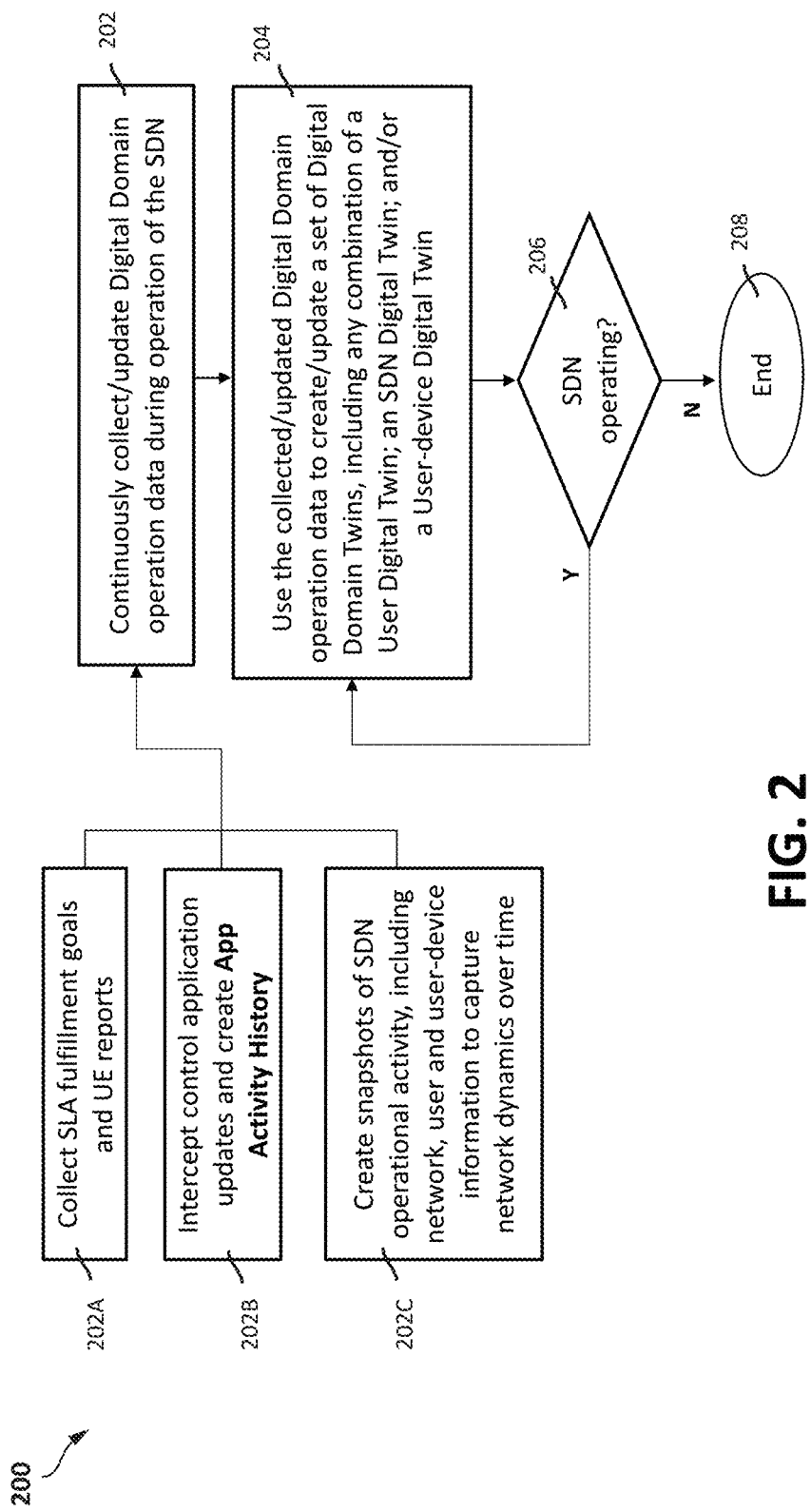
FIG. 2 depicts a flow diagram illustrating a methodology in accordance with embodiments of the invention.
Figure 9A:
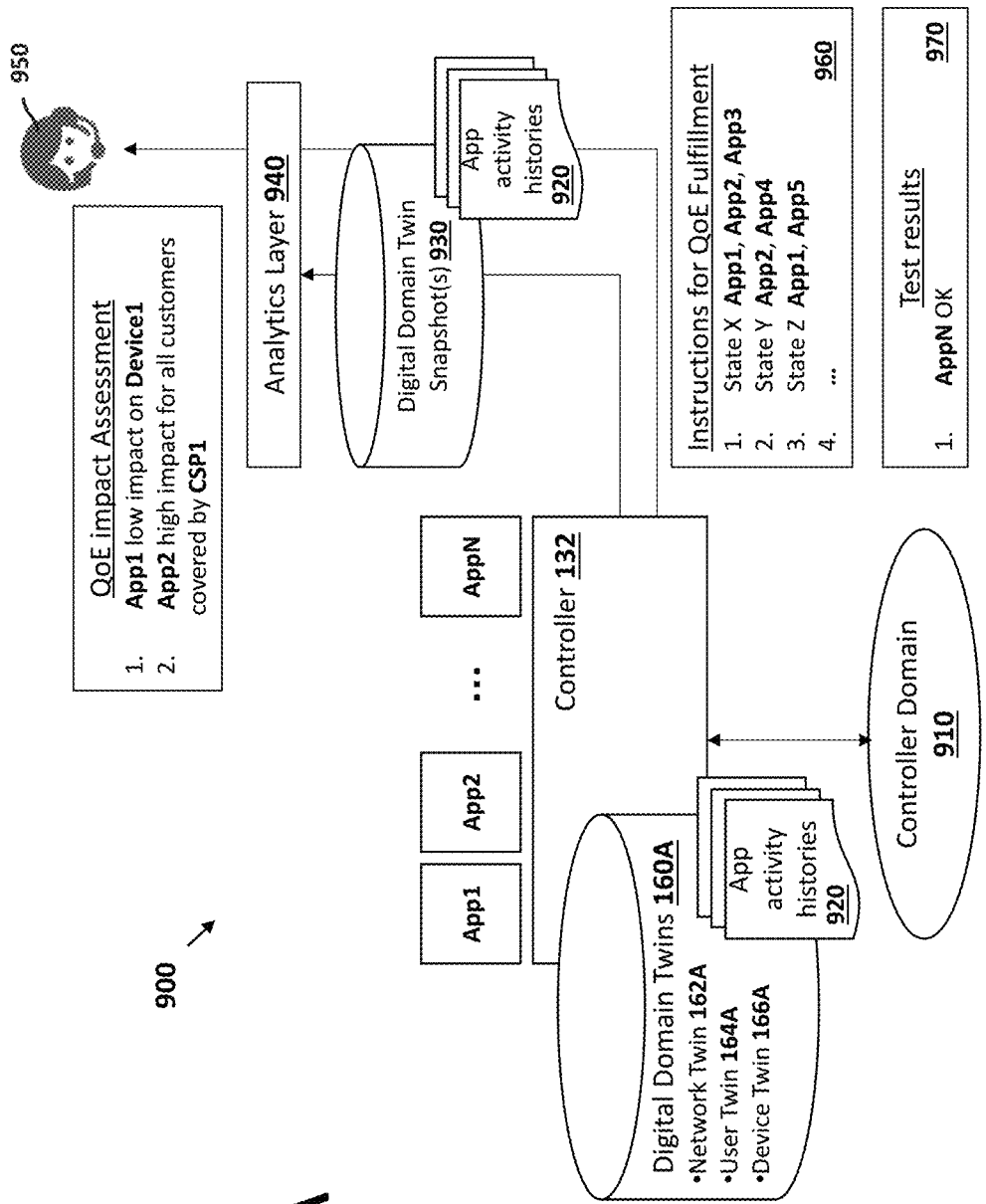
FIG. 9A depicts a block diagram illustrating process flows of a PN system in accordance with embodiments of the invention.

In embodiments of the invention, UE analysis module 134 performs a variety of operations including, for example, intercepting updates to deployed control applications, and the creation of application activity history (e.g., block 202B shown in FIG. 2; and App activity histories 920 shown in FIG. 9A). In embodiments of the invention, the UE analysis module 134 is operable to perform a pre-deployment impact analysis for an activity or a sequential set of activities from a control application (from the application activity history) to identify the impact on the QoE of the active users/subscribers). In embodiments of the invention, the UE analysis module 134 is further operable to perform periodic analysis (e.g., in a tact of tens of minutes) using simulations on the set of digital domain twins 160A in order to project the user QoE impact of individual control applications; project the user QoE impact of various deployment combinations from the available set of control applications; identification of the optimal control application combination for the observed domain for the specific QoE fulfillment; and identification of the unnecessary operations loops that target improvements of QoE that are already within the agreed SLA. In embodiments of the invention, the UE analysis module 134 is further operable to recognize in an automated manner network conditions and specific QoE fulfillment requirements for which optimal control application combination have been identified. In embodiments of the invention, the UE analysis module 134 is further operable to perform automated deployment of the identified optimal control application combinations in the domain for which network conditions and specific QoE fulfillment requirements are set. In embodiments of the invention, the UE analysis module 134 is further operable to provide a test bed to the control application owners and operators to verify the control applications on a scale that is not available in a lab environment.

Figure 3:
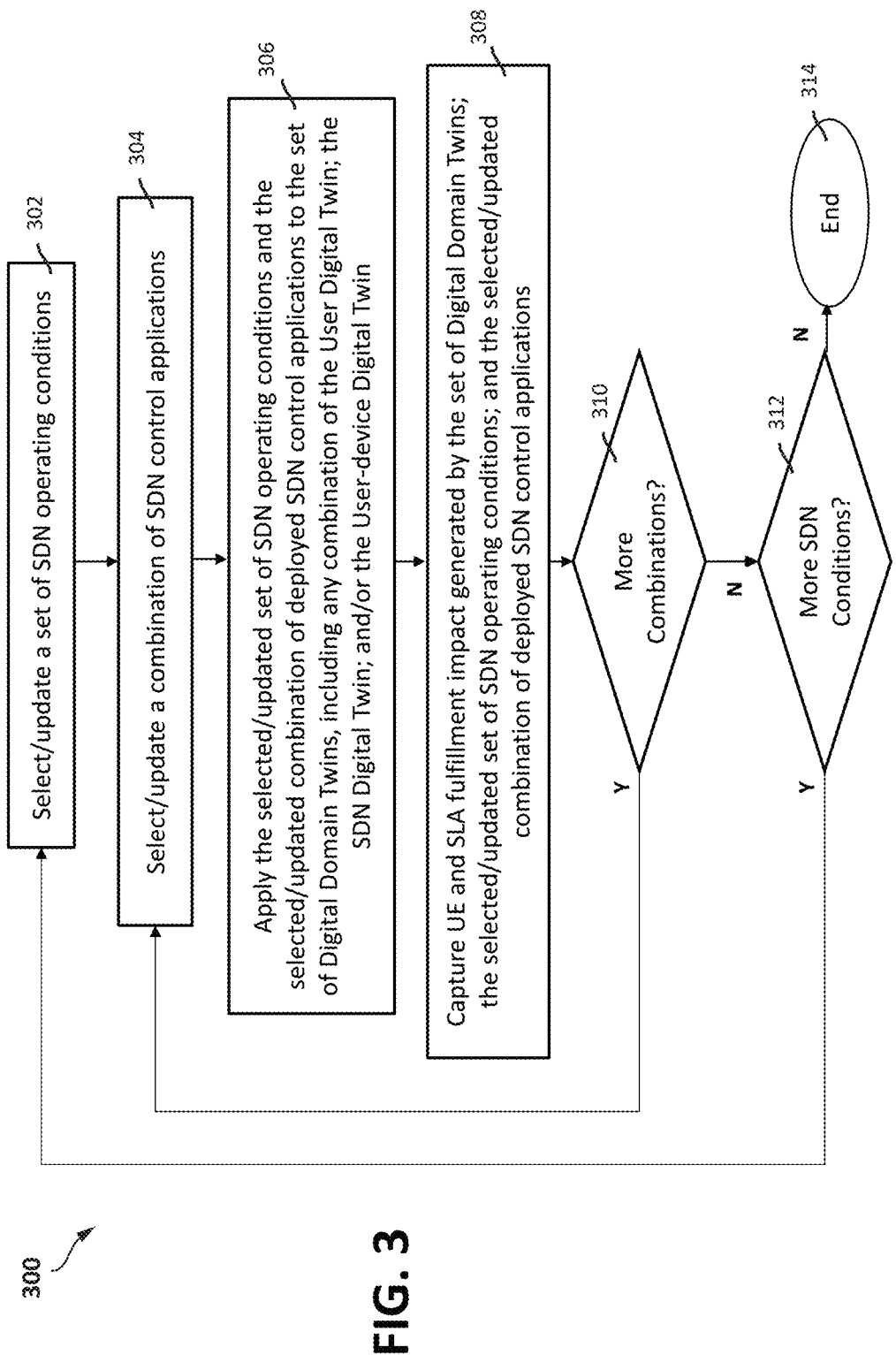
FIG. 3 depicts a flow diagram illustrating a methodology in accordance with embodiments of the invention.
Figure 4:
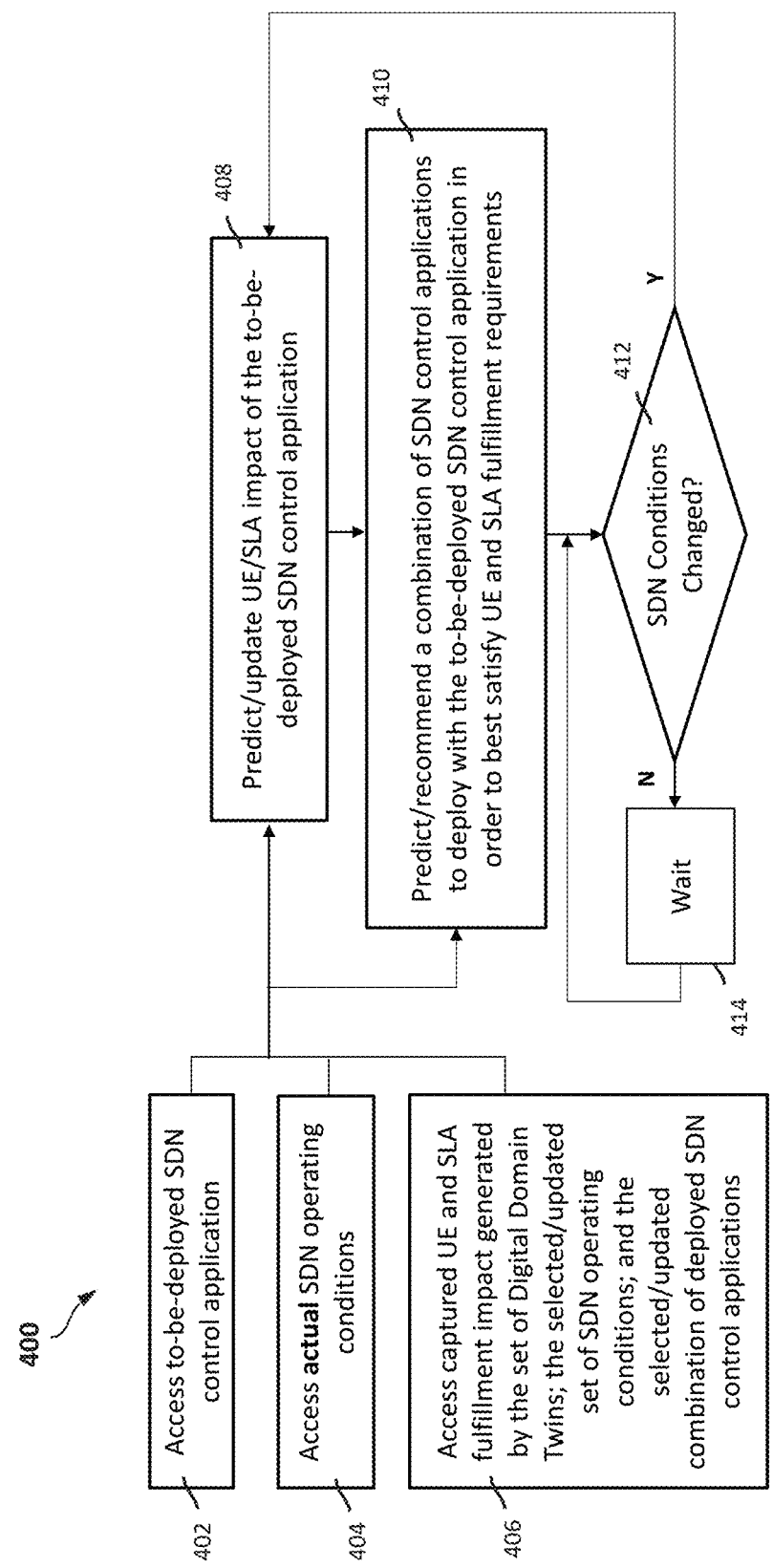
FIG. 4 depicts a flow diagram illustrating a methodology in accordance with embodiments of the invention.

Additional details of how the system 100 operates are illustrated by the computer-implemented methodologies 200, 300, 400 shown in FIGS. 2, 3, and 4, respectively. The operation of the system 100 and the methodologies 200, 300, 400 will now be provided with reference to FIGS. 1, 2, 3, and 4. Turning first to FIG. 2, the methodology 200 begins at block 202 by continuously collecting and/or updating operation data of the digital domain 160 (i.e., digital domain operation data) during operation of the SDN 110 (shown in FIG. 1). Blocks 202A, 202B, 202C depict examples of the digital domain operation data continuously collected/updated at block 202. At block 202A, SLA fulfillment goals and UE reports are collected. At block 202B, to-be-deployed control applications (new control applications and/or updates to existing control applications) are intercepted prior to deployment, and App activity histories 920 (shown in FIG. 9A) are created. At block 202C, snapshots are created of operational activity of the SDN 110, including network, user, and user-device information to capture network dynamics over time. At block 204 the methodology 200 uses the continuously collected/updated digital domain operation data to create/update the set of digital domain twins 160A, including any combination of the SDN digital twin 162A; the user digital twin 164A; and/or the user-device digital twin 166A. Decision block 206 repeats block 204 according to a schedule (periodic, event-based, etc.) as long as the SDN 110 is operating and generating the digital domain operation data that is continuously collected and updated at block 202. If it is determined at decision block 206 that the SDN 110 is no longer operating, the methodology 200 moves to block 208 and ends.

Figure 5:
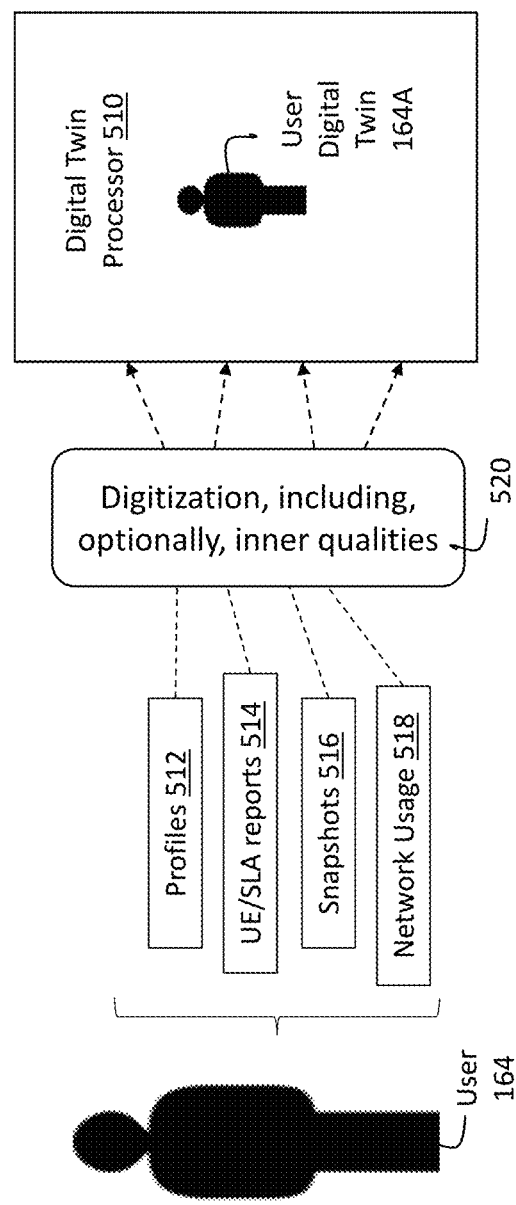
FIG. 5 depicts a block diagram illustrating a digital twin processing system in accordance with embodiments of the invention.

FIG. 5 depicts additional details of how the user digital twin 164A of block 204 and FIG. 1 can be generated using a digitization module 520 and a digital twin processor module 510 in accordance with aspects of the invention. The process of creating the user digital twin 164A can be slightly different from the process of creating the network digital twin 162A and the user-device digital twin 166A in that, for a human digital twin, not only the outer aspects of a human being (e.g., physical and physiological characteristics) are captured, but also inner qualities can be captured such as personality, sensibilities, predicted thoughts, and skills. Expressing each user's individuality through its user digital twin can improve the quality of the UE/SLA fulfillment assessments performed in accordance with aspects of the invention. As shown the digitization module 520 digitizes a variety of data types, including, for example, user profiles 512, UE/SLA reports 514, snapshots 516 (corresponding to the user twin snapshots 700 shown in FIG. 7), and network usage 518. The digitization module 520 provides the digitized data to the digital twin processor 510 where known machine learning technologies are used to create and update the user digital twin 164A.

Turning now to FIG. 3, the methodology 300 is operable to simulate a variety of SDN operating conditions and a variety of combinations of SDN control applications through the digital domain twins 160A (generated using the methodology 200) to capture the UE and SLA fulfillment impact of the various scenarios. The methodology 300 begins at block 302 by selecting/updating a set of SDN operating conditions. The SDN operating conditions can be periodically set or can be event-based. The methodology 300 moves to block 304 and selects/updates a combination of SDN control applications. At block 306, the methodology 300 applies the selected/updated set of SDN operating conditions and the selected/updated combination of deployed SDN control applications to the set of digital domain twins 160A, including any combination of the SDN digital twin 162A, the user digital twin 164A, and/or the user-device digital twin 166A. At block 308, the methodology 300 captures the UE and SLA fulfillment impact generated by the set of digital domain twins 160A. The methodology 300 further captures the selected/updated set of SDN operating conditions and the selected/updated combination of deployed SDN control applications. At decision block 310, the methodology determines whether there are additional SDN control application combinations. If the answer to the inquiry at decision block 310 is yes, the methodology 300 returns to block 304 and performs additional iterations of the operations at blocks 304, 306, 308. If the answer to the inquiry at decision block 310 is no, the methodology 300 moves to decision block 312 to determines whether there are additional SDN control application combinations. If the answer to the inquiry at decision block 312 is yes, the methodology 300 returns to block 302 and performs additional iterations of the operations at blocks 302, 304, 306, 308, 310. If the answer to the inquiry at decision block 312 is no, the methodology 300 moves to block 314 and ends.

Turning now to FIG. 4, the methodology 400 is operable to utilize the data captured at block 308, along with other data, to predict/recommend a combination of SDN control applications to deploy with a to-be-deployed SDN control application in order to best satisfy UE and SLA fulfillment requirements. The methodology 400 begins by performing, substantially in parallel, the operations at blocks 402, 404, 406. At block 402, the methodology 400 accesses a to-be-deployed SDN control application. At block 404, the methodology 400 accesses actual SDN operating conditions. At block 406, the methodology 400 accesses the captured UE and SLA fulfillment impact generated by the set of digital domain twins 160A, which includes the network digital twin 162A, the user digital twin 164A, and the user-device digital twin 166A. The methodology 400 further captures the selected/updated set of SDN operating conditions and the selected/updated combination of deployed SDN control applications. The outputs from blocks 402, 404, 406 are provided to block 408. At block 408, the methodology 400 predicts/updates the UE/SLA impact of the to-be-deployed SDN control application. The outputs from blocks 402, 404, 406, 408 are provided to block 410. At block 410, the methodology 400 predicts/recommends a combination of SDN control applications to deploy with the to-be-deployed SDN control application in order to best satisfy UE and SLA fulfillment requirements. At decision block 412, the methodology 400 determines whether the SDN conditions have changed. If the answer to the inquiry at decision block 412 is yes, the methodology 400 returns to block 408 and performs additional iterations of the operations at blocks 408, 410, 412. If the answer to the inquiry at decision block 412 is no, the methodology 400 moves to block 414 and waits then returns to the input to decision block 412.

Moving ahead to FIG. 9A, FIG. 9A depicts a block diagram illustrating mechanisms and process flows of a PN system 900 in accordance with embodiments of the invention. The controller 132 (which corresponds to the controller 132 shown in FIG. 1) controls the assigned controller domain 910. The controller 132 hosts "N" (N=whole number) total available control applications. The hosted control applications are depicted as App1, App2 . . . AppN. The control applications (App1, App2 . . . AppN) register to receive specific events from the PN (e.g., SDN architecture 110 shown in FIG. 1) and react according to their own operational logic.

In accordance with aspects of the invention, the digital domain twins 160A includes a network digital twin 162A, a user digital twin 164A, and a user-device digital twin 166A. The controller 132 is operable to control the dynamic creation and updating (e.g., using the methodology 200 shown in FIG. 2) of the digital domain twins 160A using continuously collected and updated digital domain operation data (e.g., block 202 of the methodology 200 shown in FIG. 2). For the network digital twin 162A, the digital domain operation data includes information about the user 164 (shown in FIGS. 1 and 5), control plane conditions, and installed infrastructure details (e.g., infrastructure layer 140 shown in FIG. 1). The digital domain operation data can also contain information about the connectivity between each individual user and the network infrastructure layer 140 (e.g., switching devices, radio assets, and the like). Examples of the types of digital domain operation data that can be used to create the network digital twin 162A are depicted in the network twin snapshot table 600 shown in FIG. 6.

For the user digital twin 164A, the digital domain operation data includes information about each user's SLA, perceived QoE, the desired QoE, the user's activity/mobility, lists of the user's active sessions, and the end-user's services. Examples of the types of digital domain operation data that can be used to create the user digital twin 164A are depicted in the user twin snapshot table 700 shown in FIG. 7. For the user-device digital twin 166A, the digital domain operation data includes information about the end-user individual devices and their specific capabilities. The digital domain operation data also contains the information about the relation between the user-devices (e.g., User-device1, User-device2, User-device3 shown in FIG. 9B; and user-device 166 shown in FIG. 1) and individual users 164. Examples of the types of digital domain operation data that can be used to create the user-device digital twin 166A are depicted in the user-device twin snapshot table 800 shown in FIG. 8.

The digital domain operation data reflected in the tables 600, 700, 800 (shown in FIGS. 6-8) is collected periodically according to a schedule, or is collected for events (outdoor concert), areas (near office buildings during business hours), or time periods (family-centric holidays like Thanksgiving) that are likely to provide useful data about UE/SLA impact. The digital domain operation data reflected in the tables 600, 700, 800 can be collected from different sources like databases, configurations from OSS (operational support system), performance data from OSS, probe data, call traces, device vendors, a network protocol analyzer (e.g., Wireshark®), inventory tools, BSS (business support system) data, and the like. The controller 132 can create a digital domain twin snapshot 930 of the digital domain twins 160A at a specific point of time, which includes all the information that is collected until that point of time, and sends it to the analytics layer 940 in a network of an owner of the relevant PN(s) with the specific ask. The controller 132 also collects control application activity (operations performed by the various control applications of the controller 132) and creates application activity histories 920, which are passed to the analytics layer 940 together with the digital domain twin snapshot(s) 930 of the digital domain twins 160A.

The analytics layer 940 runs the AI/ML algorithms (e.g., the classifier system 1000 shown in FIG. 10) using the digital domain twin snapshot 930 of the digital domain twins 160A and the application activity history 920 as the input. In accordance with some embodiments of the invention, the AI/ML algorithms are trained to perform tasks associated with predicting the UE/SLA impact of a to-be-deployed control application and/or a combination of the to-be-deployed control applications and other control applications in the runtime of a programmable network such as an SDN. In accordance with some embodiments of the invention, the AI/ML algorithms can also be trained to perform tasks associated with recommending combinations of control applications (e.g., the to-be-deployed control application and other control applications in the runtime of a programmable network) that satisfy the UE/SLA and operator-selected specific operational goals (e.g., SLA fulfillment with the least energy consumption, SLA fulfillment with superior service for premium customers, etc.) while taking into account characteristics of the relevant PN (e.g., PN1, PN2 shown in FIG. 9B), users 164 (shown in FIGS. 1 and 5), and user-devices (e.g., User-device1, User-device2, User-device3 shown in FIG. 9B). In accordance with some embodiments of the invention, the AI/ML algorithms can also be trained to perform tasks associated with recommending combinations of control applications (e.g., the to-be-deployed control application and other control applications in the runtime of a programmable network) that optimize UE/SLA levels while taking into account characteristics of the relevant PN, users 164, and user-devices. The UE/SLA-related tasks of the AI/ML algorithms can be targeted to prioritize certain results, including, for example, prioritizing one combination of control applications (e.g., the to-be-deployed control application and other control applications in the runtime of a programmable network) among many that reduces energy consumption the most or achieves a superior UE/SLA for specific devices.

In accordance with embodiments of the invention, the UE/SLA-related tasks of the AI/ML algorithms of the analytics layer 940 can also include generating its QoE impact assessment in the form of an icon-based GUI (graphical user interface) in which icons are used to represent different types of PNs; different types of users; different types of user-devices; and different combinations of the control application deployment combinations that each satisfy the UE and SLA fulfillment requirements. The icon-based GUI can use a pre-deployment view of the control application deployment combinations that can be compared with a "predicted" post deployment view of the control application deployment combinations to show graphically how the UE and SLA fulfillment prior to deployment of the new/updated control application combination is predicted to compare with the UE and SLA fulfillment after deployment of the new/updated control application combination. The icon-based GUI can be displayed to, for example, an operator 950.

In accordance with embodiments of the invention, the UE/SLA-related tasks of the AI/ML algorithms of the analytics layer 940 can also include generating test results 970 towards the controller 132, which is relevant for automated assessment and deployment of control applications. In accordance with embodiments of the invention, the UE/SLA-related tasks of the AI/ML algorithms of the analytics layer 940 can also include generating instructions for QoE fulfillment 960 towards the controller 132. The controller 132 can leverage this information to automatically reconfigure the deployed application set.

In embodiments of the invention, the owners of the relevant PNs (e.g., SDN architecture 110) have "K" number of control applications that can govern network behavior. The control applications are deployed to run in specific network domains, such that two domains might have a different set of control applications running at the observed point of time, for example, urban vs. rural regions; regions with a high share of ultra-low latency traffic vs. regions with a low share of ultra-low latency traffic; regions with high level redundancy vs. regions with low levels of redundancy; similar functionality control applications from different vendors, and the like. As the conditions of the PN change, e.g., ultra-low latency traffic shifts to a different domain, the set of control applications that was previously deployed in the observed domain might not be optimal anymore. In such cases, embodiments of the invention can be used to automatically identify sub-optimal domain behavior governance and propose a different set of the control applications to be deployed in the domain under specific conditions.

It can also be the case that a certain set of control application deployment combinations may improve certain end user's desired QoE (like low latency requirement) but may lead to degradation of certain end-user's desired QoE (like data throughput) so the analytics layer 940 would also be capable of handling the control applications' implementation gaps and accordingly would be able to configure different control applications sets for different users served by same base station in runtime.

In accordance with embodiments of the invention, the analytics layer 940 is operable to considers user-device capabilities when assessing control application actions because it could be the case that a user-device A may be supporting three (3) carriers while user-device B may be only supporting one (1) carrier so UE/SLA impact of control applications may be visible for user-device A but not on user-device B so a diverse set of control applications would be needed to overcome the UE/SLA issue in this scenario.

Accordingly, it can be seem from the foregoing detailed description that embodiments of the invention provide technical effects and benefits. In known PNs/SDNs, updates issued by the control applications are not justified in the context of the customer QoE/SLA fulfillment. The failure to adequately factor in customer QoE/SLA considerations results in unclear customer impact of deployed new/updated control application in that current control application deployments are focused on network operations goal so it is not clear how a specific update from a specific control application relates to the QoE/SLA fulfilment and the type of impact the specific update has on end consumers. The failure to adequately factor in customer QoE/SLA considerations results in unnecessary control application updates. In other words, some updates may perform improvements that are actually not needed as all users have adequate and desired QoE/SLA fulfilled at the observed point of time and at the same point of time there is no higher-level policy to justify such updates (e.g., energy saving). The failure to adequately factor in customer QoE/SLA considerations results in difficulties in evaluating the impact of a control application. For example, the operational network may have users with diverse applications and end devices with diverse requirements and capabilities, which cannot be simulated in lab using known techniques. The failure to adequately factor in customer QoE/SLA considerations results in Difficulties in evaluating combined impact of multiple control apps, e.g., when two or more applications govern the network behavior it is not straightforward to identify their combined effect on the QoE and how actions enforced by each contribute to the SLA fulfilment. In this invention proposal we suggest a mechanism for assessment of impact of a control application or a set of applications on the perceived QoE. The mechanism can also be used to identify and propose the optimal combination of control applications for reaching specific operational goal (e.g., SLA fulfilment with the least energy consumption, SLA fulfilment with superior service for premium customers, etc.).

Embodiments of the invention address the shortcomings in existing PN/SDN technologies by developing novel UE/QoE/SLA analysis techniques operable to closely monitor and analyze control applications prior to deployment, and taking into account all consumer-impacting scenarios before putting the control applications into operation. Embodiments of the invention collects real network snapshots, create a set of digital twins (network, user/customer and user-device levels) and assess or predict the QoE impact when given control application updates scenarios in the digital twin before deployment throughout the real network.

More specifically, the novel UE/QoE/SLA analysis techniques disclosed herein provide continuous and dynamic assessment of the UE/QoE/SLA effect of an observed pre-deployment control application or a combination of pre-deployment control applications by generating and leveraging a digital network twin and event history data gathered from the real operational network. The novel UE/QoE/SLA analysis techniques can include, inter alia, creating a set of digital domain twins for the control plane entities; intercepting updates from deployed control applications for the creation of control application activity history; performing impact analysis for an activity or a sequential set of activities from a control application (from the application activity history) to identify the impact on the UE/QoE/SLA of the active subscribers; performing periodical analysis (in a tact of tens of minutes) using simulations on the fresh digital domain twin; recognizing in and automated manner network conditions and specific UE/QoE/SLA fulfilment requirements for which optimal control application combinations have been identified; performing automated deployment of the identified optimal control application combination in the domain in which network conditions and specific UE/QoE/SLA fulfilment requirements; and providing test beds to the control application owners and operators to verify the control applications on a scale that is not available in the lab environment.

In embodiments of the invention, creating the digital domain twin for the control plane entities includes information on a network twin, a user/customer twin, and a user-device twin. The network twin is generated and maintained using domain infrastructure-related data including the installed network hardware assets, spectrum carriers, technology support, their location and capabilities. The network twin is also generated and maintained using domain user-plane state including performance and fault data, as well as domain control-plane state including the set of deployed and active control applications and a sequential set of triggered actions from the control applications (activity). The user/customer twin is generated and maintained using user-related data including user location, mobility and activity patterns, application usage, desired QoE, current QoE, customer profile, SLAs and end-user service activity. The user-device twin covers terminals in use, terminal capabilities, perceived network conditions, carriers supported, and the like.

In embodiments of the invention, the above-described performing of periodical analysis (in a tact of tens of minutes) using simulations on the fresh digital domain twin is perform in order to: project the subscriber QoE impact of individual control applications; project the subscriber QoE impact of various deployment combinations from the available set of control applications and identification of the optimal control application combination for the observed domain for the specific QoE fulfilment; and identify the unnecessary operations loops that target improvements of QoE that are already within the agreed SLA.

The novel UE/QoE/SLA analysis techniques disclosed herein provide, inter alia, QoE impact assessment towards the user in the form of, for example, a GUI; test results towards the controller, which is relevant for automated assessment and deployment of control applications; instructions for QoE Fulfilment towards the controller, which can leverage this information to automatically reconfigure the deployed control application set. In accordance with aspects of the invention, operators who own programmable network have "K" number of control applications that can govern network behavior. The control applications are deployed to run in specific network domains, such that two domains might have different set of control applications running at the observed point of time, e.g., urban vs rural regions, regions with high vs low share of ultra-low latency traffic, regions with high vs low level of redundancy, similar functionality control applications from different vendors, etc. As the conditions of the network change, e.g., ultra-low latency traffic shifts to a different domain, the set of control applications that was previously deployed in the observed domain might not be optimal anymore. In such cases, the novel UE/QoE/SLA analysis techniques disclosed herein can be used to automatically identify sub-optimal domain behavior governance and propose a different set of the control applications to be deployed in the domain under specific conditions.

It can also be a case that certain sets of control application deployment can improve certain end consumers desired QoE (like low latency requirement) but can lead degradation of certain end consumers desired QoE (like data throughput) so the novel UE/QoE/SLA analysis techniques disclosed herein would also be capable of handling the control applications implementation gaps and accordingly would be able to configure different control applications sets for different users served by same base station in run time.

The novel UE/QoE/SLA analysis techniques disclosed herein considers device capabilities for taking control application actions as there can be the case device A may be supporting three (3) carriers while device B may be only supporting one (1) carrier so control application impact may be visible for device A but not on device B so a diverse set of control applications would be needed (and recommended) to overcome this scenario.

An example of machine learning techniques that can be used to implement aspects of the invention will be described with reference to FIGS. 10 and 11. Machine learning models configured and arranged according to embodiments of the invention will be described with reference to FIG. 10. Detailed descriptions of an example computing system 1200 and network architecture capable of implementing embodiments of the invention described herein will be provided with reference to FIG. 12.

Figure 10:
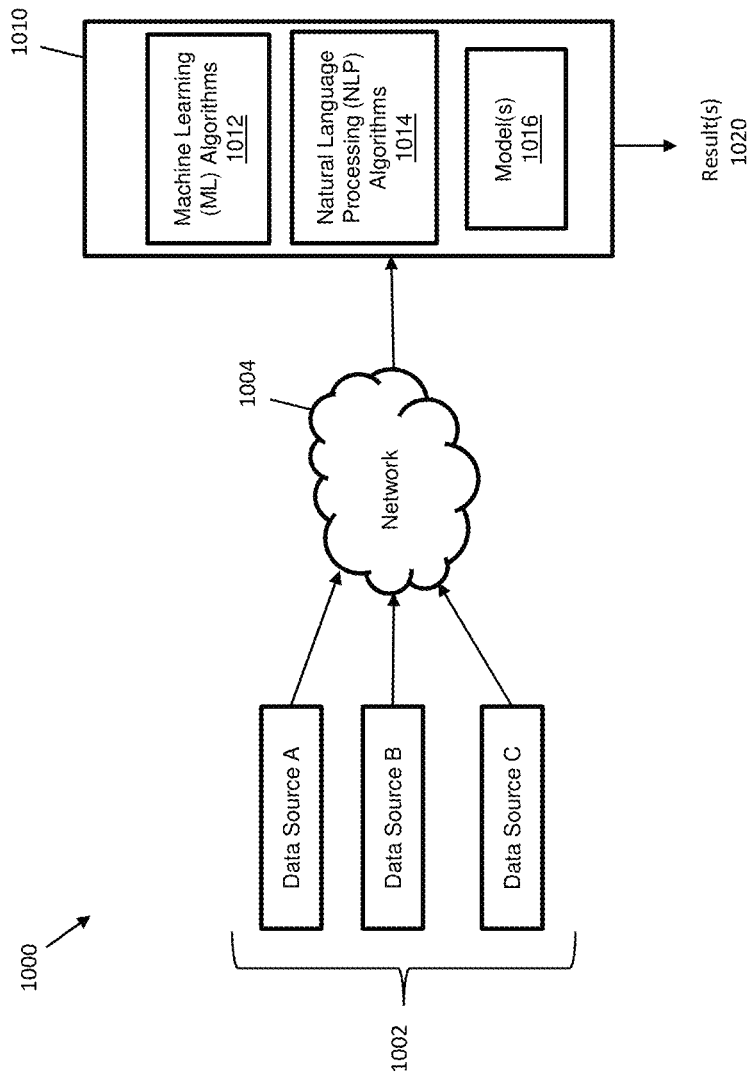
FIG. 10 depicts a machine learning system that can be utilized to implement aspects of the invention.

FIG. 10 depicts a block diagram showing a classifier system 1000 capable of implementing various aspects of the invention described herein. More specifically, the functionality of the system 1000 is used in embodiments of the invention to generate various models and/or sub-models that can be used to implement computer functionality in embodiments of the invention. The system 1000 includes multiple data sources 1002 in communication through a network 1004 with a classifier 1010. In some aspects of the invention, the data sources 1002 can bypass the network 1004 and feed directly into the classifier 1010. The data sources 1002 provide data/information inputs that will be evaluated by the classifier 1010 in accordance with embodiments of the invention. The data sources 1002 also provide data/information inputs that can be used by the classifier 1010 to train and/or update model(s) 1016 created by the classifier 1010. The data sources 1002 can be implemented as a wide variety of data sources, including but not limited to, sensors configured to gather real time data, data repositories (including training data repositories), and outputs from other classifiers. The network 1004 can be any type of communications network, including but not limited to local networks, wide area networks, private networks, the Internet, and the like.

Figure 12:
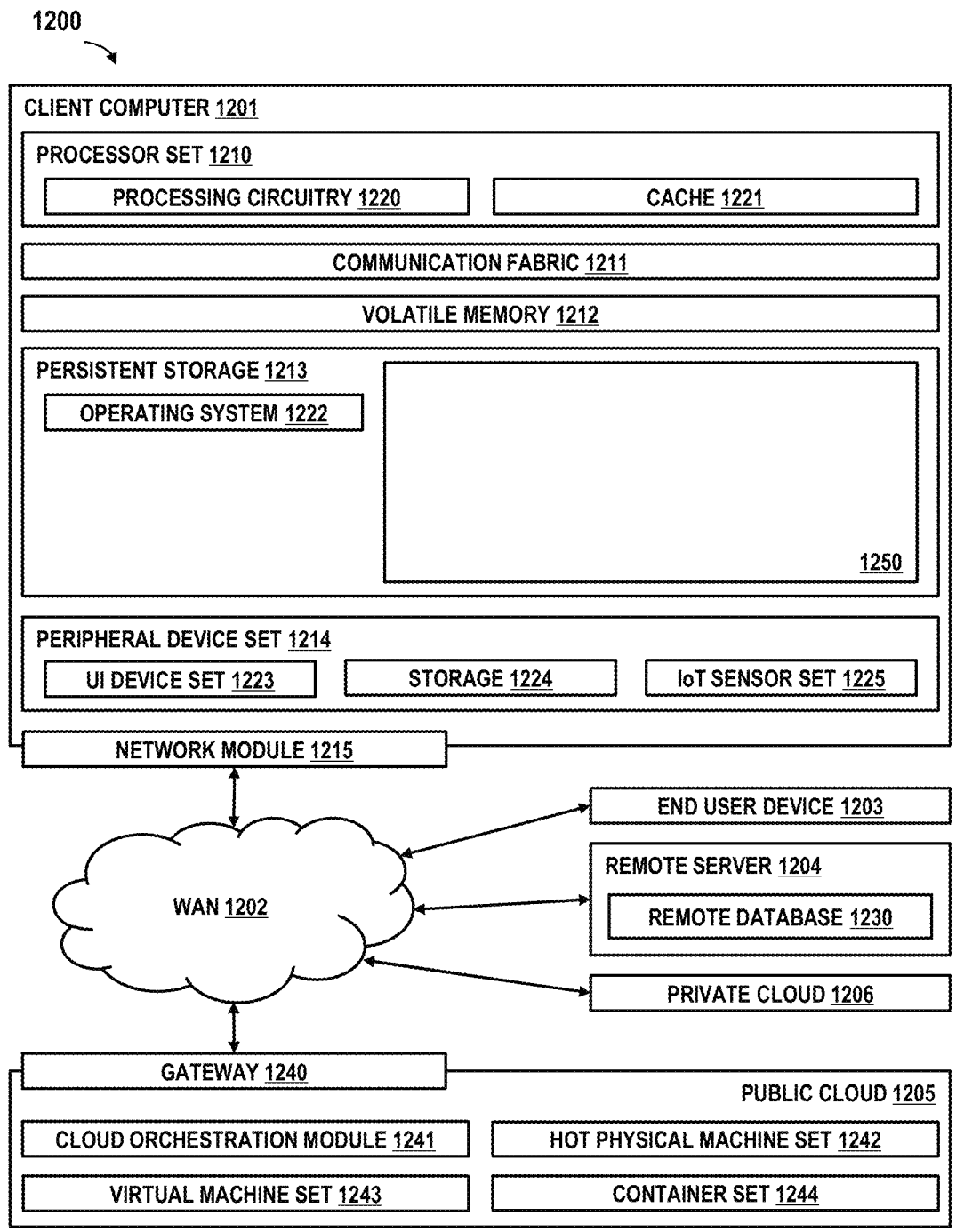
FIG. 12 depicts a computing environment operable to implement aspects of the invention.

The classifier 1010 can be implemented as algorithms executed by a programmable computer such as the computing system 1200 (shown in FIG. 12). As shown in FIG. 10, the classifier 1010 includes a suite of machine learning (ML) algorithms 1012; natural language processing (NLP) algorithms 1014; and model(s) 1016 that are relationship (or prediction) algorithms generated (or learned) by the ML algorithms 1012. The algorithms 1012, 1014, 1016 of the classifier 1010 are depicted separately for ease of illustration and explanation. In embodiments of the invention, the functions performed by the various algorithms 1012, 1014, 1016 of the classifier 1010 can be distributed differently than shown. For example, where the classifier 1010 is configured to perform an overall task having sub-tasks, the suite of ML algorithms 1012 can be segmented such that a portion of the ML algorithms 1012 executes each sub-task and a portion of the ML algorithms 1012 executes the overall task. Additionally, in some embodiments of the invention, the NLP algorithms 1014 can be integrated within the ML algorithms 1012.

The NLP algorithms 1014 includes text recognition functionality that allows the classifier 1010, and more specifically the ML algorithms 1012, to receive natural language data (e.g., text written as English alphabet symbols) and apply elements of language processing, information retrieval, and machine learning to derive meaning from the natural language inputs and potentially take action based on the derived meaning. The NLP algorithms 1014 used in accordance with aspects of the invention can also include speech synthesis functionality that allows the classifier 1010 to translate the result(s) 1020 into natural language (text and audio) to communicate aspects of the result(s) 1020 as natural language communications.

The NLP and ML algorithms 1014, 1012 receive and evaluate input data (i.e., training data and data-under-analysis) from the data sources 1002. The ML algorithms 1012 include functionality that is necessary to interpret and utilize the input data's format. For example, where the data sources 1002 include image data, the ML algorithms 1012 can include visual recognition software configured to interpret image data. The ML algorithms 1012 apply machine learning techniques to received training data (e.g., data received from one or more of the data sources 1002) in order to, over time, create/train/update one or more models 1016 that model the overall task and the sub-tasks that the classifier 1010 is designed to complete.

Figure 11:
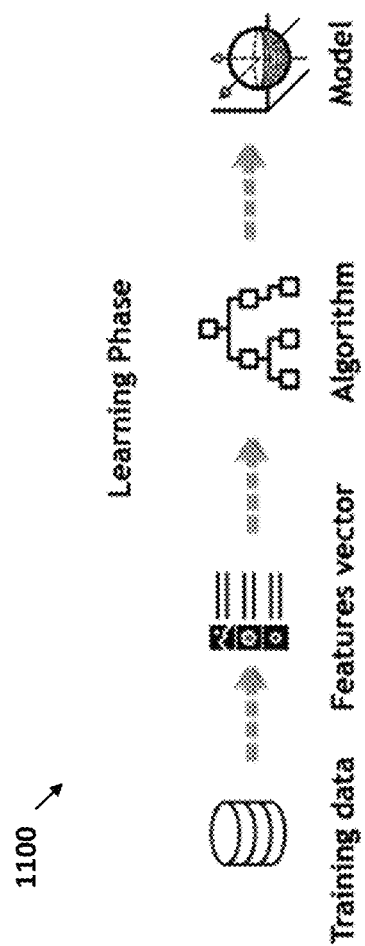
FIG. 11 depicts a learning phase that can be implemented by the machine learning system shown in FIG. 10.

Referring now to FIGS. 10 and 11 collectively, FIG. 11 depicts an example of a learning phase 1100 performed by the ML algorithms 1012 to generate the above-described models 1016. In the learning phase 1100, the classifier 1010 extracts features from the training data and converts the features to vector representations that can be recognized and analyzed by the ML algorithms 1012. The feature vectors are analyzed by the ML algorithm 1012 to "classify" the training data against the target model (or the model's task) and uncover relationships between and among the classified training data. Examples of suitable implementations of the ML algorithms 1012 include but are not limited to neural networks, support vector machines (SVMs), logistic regression, decision trees, hidden Markov Models (HMMs), etc. The learning or training performed by the ML algorithms 1012 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 1010 and the ML algorithms 1012. Unsupervised learning can utilize additional learning/training methods including, for example, clustering, anomaly detection, neural networks, deep learning, and the like.

When the models 1016 are sufficiently trained by the ML algorithms 1012, the data sources 1002 that generate "real world" data are accessed, and the "real world" data is applied to the models 1016 to generate usable versions of the results 1020. In some embodiments of the invention, the results 1020 can be fed back to the classifier 1010 and used by the ML algorithms 1012 as additional training data for updating and/or refining the models 1016.

In aspects of the invention, the ML algorithms 1012 and the models 1016 can be configured to apply confidence levels (CLs) to various ones of their results/determinations (including the results 1020) in order to improve the overall accuracy of the particular result/determination. When the ML algorithms 1012 and/or the models 1016 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 1010 can be configured to apply confidence levels (CLs) to the results 1020. When the classifier 1010 determines that a CL in the results 1020 is below a predetermined threshold (TH) (i.e., CL<TH), the results 1020 can be classified as sufficiently low to justify a classification of "no confidence" in the results 1020. If CL>TH, the results 1020 can be classified as sufficiently high to justify a determination that the results 1020 are valid. Many different predetermined TH levels can be provided such that the results 1020 with CL>TH can be ranked from the highest CL>TH to the lowest CL>TH.

In this detailed description, the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 12 depicts an example computing environment 1200 that can be used to implement aspects of the invention. Computing environment 1200 contains an example of an environment for the execution of at least some of the computer code involved in performing the inventive methods, such as computer-implemented methods and computer program products 1250 operable to identify the user experience (UE) and service level agreement (SLA) fulfillment impact of control application software prior to deployment of the control application in its programmable network. In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    intercepting, using a controller of a programmable network (PN), a deployment of a control application in the PN, wherein the control application is configured to, when deployed, direct data traffic of the PN according to a forwarding policy;
    responsive to intercepting the deployment of the control application, performing a pre-deployment user experience (UE) analysis comprising:
        determining, based at least in part on a set of digital twins and an application activity history of already-deployed control applications in the PN, a UE impact of the control application;
        wherein the set of digital twins comprises a separately-created PN digital twin of the PN and a separately-created user digital twin of a user of the PN;
        wherein the separately-created user digital twin is separate from the separately-created PN digital twin;
        wherein information used to create the separately-created user digital twin comprises information about a service level agreement (SLA) and a perceived quality of experience (QoE) of the user of the PN; and
        based at least in part on the UE impact, generating a UE-based control application deployment recommendation; and
    responsive to the UE-based control application deployment recommendation, deploying the control application.

2. The computer-implemented method of claim 1, wherein the UE analysis further comprises predicting a change in how the control application will perform after the deployment of the control application.

3. The computer-implemented method of claim 2, wherein predicting the change in how the deployed control application and the control application will perform after the deployment of the control application is based at least in part on:
    a PN condition; and
    a capability of a user-device deployed in the PN.

4. The computer-implemented method of claim 1, wherein determining the UE impact of the control application comprises predicting the UE impact of:
    the control application; and
    the already-deployed control applications in a runtime of the PN.

5. The computer-implemented method of claim 1, wherein:
    the UE analysis further comprises:
        collecting UE data of the user of the PN during operation of the PN; and
        using the UE data of the user to create the separately-created user digital twin; and
    the UE data comprises the information about the SLA and the perceived QoE of the user of the PN.

6. The computer-implemented method of claim 5, wherein the UE analysis further comprises:
  collecting operating data of the PN during operation of the PN; and
  using the operating data of the PN to create the separately-created PN digital twin.

7. The computer-implemented method of claim 6, wherein:
  the set of digital twins further comprises a separately-created user-device digital twin of a user-device operable to use the PN; and
  the UE analysis further comprises:
    collecting user-device data of the user-device while the user-device is using the PN; and
    using the user-device data to create the separately-created user-device digital twin.

8. The computer-implemented method of claim 1, wherein the controller is a node of a cloud computing system.

9. A computer-based system comprising a memory and a processor system communicatively coupled to the memory, wherein the processor system is configured to perform processor system operations comprising:
  intercepting a deployment of a control application through a programmable network (PN), wherein the control application is configured to, when deployed, direct data traffic of the PN according to a forwarding policy;
  responsive to intercepting the deployment of the control application, performing a pre-deployment user experience (UE) analysis comprising:
    determining, based at least in part on a set of digital twins and an application activity history of already-deployed control applications in the PN, a UE impact of the control application;
    wherein the set of digital twins comprises a separately-created PN digital twin of the PN and a separately-created user digital twin of a user of the PN;
    wherein the separately-created user digital twin is separate from the separately-created PN digital twin;
    wherein information used to create the separately-created user digital twin comprises information about a service level agreement (SLA) and a perceived quality of experience (QoE) of the user of the PN; and
    based at least in part on the UE impact, generating a UE-based control application deployment recommendation; and
  responsive to the UE-based control application deployment recommendation, deploying the control application.

10. The computer-based system of claim 9, wherein the UE analysis further comprises predicting a change in how the control application will perform after the deployment of the control application.

11. The computer-based system of claim 10, wherein predicting the change in how the deployed control application and the control application will perform after the deployment of the control application is based at least in part on:
  a PN condition; and
  a capability of a user-device deployed in the PN.

12. The computer-based system of claim 9, wherein determining the UE impact of the control application comprises predicting the UE impact of:
  the control application; and
  the already-deployed control applications in a runtime of the PN.

13. The computer-based system of claim 9, wherein:
  the UE analysis further comprises:
    collecting UE data of the user of the PN during operation of the PN; and
    using the UE data of the user to create the separately-created user digital twin; and
  the UE data comprises the information about the SLA and the perceived QoE of the user of the PN.

14. The computer-based system of claim 13, wherein the UE analysis further comprises:
  collecting operating data of the PN during operation of the PN; and
  using the operating data of the PN to create the separately-created PN digital twin.

15. The computer-based system of claim 14, wherein:
  the set of digital twins further comprises a separately-created user-device digital twin of a user-device operable to use the PN; and
  the UE analysis further comprises:
    collecting user-device data of the user-device while the user-device is using the PN; and
    using the user-device data to create the separately-created user-device digital twin.

16. A computer program product comprising a computer readable program stored on a computer readable storage medium, wherein the computer readable program, when executed on a processor system, causes the processor system to perform processor system operations comprising:
  intercepting a deployment of a control application in a programmable network (PN), wherein the control application is configured to, when deployed, direct data traffic of the PN according to a forwarding policy;
  responsive to intercepting the deployment of the control application, performing a pre-deployment user experience (UE) analysis comprising:
    determining, based at least in part on a set of digital twins and an application activity history of already-deployed control applications in the PN, a UE impact of the control application;
    wherein the set of digital twins comprises a separately-created PN digital twin of the PN and a separately-created user digital twin of a user of the PN;
    wherein the separately-created user digital twin is separate from the separately-created PN digital twin;
    wherein information used to create the separately-created user digital twin comprises information about a service level agreement (SLA) and a perceived quality of experience (QoE) of the user of the PN; and
    based at least in part on the UE impact, generating a UE-based control application deployment recommendation; and
  responsive to the UE-based control application deployment recommendation, deploying the control application.

17. The computer program product of claim 16, wherein the UE analysis further comprises predicting a change in how the control application will perform after the deployment of the control application.

18. The computer program product of claim 17, wherein predicting the change in how the deployed control application and the control application will perform after the deployment of the control application is based at least in part on:
  a PN condition; and
  a capability of a user-device deployed in the PN.

19. The computer program product of claim 16, wherein determining the UE impact of the control application comprises predicting the UE impact of:
  the control application; and
  the already-deployed control applications in a runtime of the PN.

20. The computer program product of claim 16, wherein:
  the set of digital twins further comprises a separately-created user-device digital twin of a user-device operable to use the PN; and
  the UE analysis further comprises:
    collecting operating data of the PN during operation of the PN;
    using the operating data of the PN to create the separately-created PN digital twin;
    collecting user-device data of the user-device while the user-device is using the PN; and
    using the user-device data to create the separately-created user-device digital twin; and
  the UE data comprises the information about the SLA and the perceived QoE of the user of the PN.

\* \* \* \* \*